United States Patent [19]

Tung

[11] Patent Number: 4,835,205
[45] Date of Patent: May 30, 1989

[54] COPOLYESTER ADHESIVE CONTAINING HYROXYMETHYL BENZOIC ACID

[75] Inventor: William C. T. Tung, Tallmadge, Ohio

[73] Assignee: The Goodyear Tire & Rubber Company, Akron, Ohio

[21] Appl. No.: 142,894

[22] Filed: Jan. 11, 1988

[51] Int. Cl.[4] .......................... C08K 5/06; C08G 63/16
[52] U.S. Cl. ..................... 524/361; 524/378; 524/605; 528/302; 528/305
[58] Field of Search ............ 528/302, 305, 295.5; 524/361, 378, 605

[56] References Cited

U.S. PATENT DOCUMENTS

| 4,065,439 | 12/1977 | Uno et al. | 528/302 |
| 4,439,595 | 3/1984 | Sublett et al. | 528/302 |
| 4,446,302 | 5/1984 | Sandhu et al. | 528/302 |
| 4,520,188 | 5/1985 | Holzrichter et al. | 528/305 |
| 4,656,243 | 4/1987 | Pedain et al. | 528/302 |
| 4,692,506 | 9/1987 | Yatsu et al. | 528/302 |

FOREIGN PATENT DOCUMENTS 92395 7/1975 Japan ...................... 528/305

Primary Examiner—John Kight
Assistant Examiner—Dennis R. Daley
Attorney, Agent, or Firm—Alvin T. Rockhill

[57] ABSTRACT

Solution or lacquer adhesives are utilized in a wide variety of applications. Such adhesives are particularly useful because they can be easily applied to a substrate. This invention relates to a copolyester which is particularly useful as an adhesive which is comprised of repeat units which are derived from (a) diacid component which is comprised of (1) from 0 to 60 mole percent terephthalic acid and (2) from 40 to 100 mole percent of at least one aliphatic dicarboxylic acid containing from 4 to 12 carbon atoms; (b) a diol component which is comprised of (1) from 0 to 75 mole percent neopentyl glycol and (2) from 25 to 100 mole percent ethylene glycol; and (c) hydroxymethyl benzoic acid.

25 Claims, No Drawings

COPOLYESTER ADHESIVE CONTAINING HYROXYMETHYL BENZOIC ACID

BACKGROUND OF THE INVENTION

Solution or lacquer adhesives are bonding compositions which achieve a solid state and resultant strength through evaporation or removal of solvent. This is in contrast to hot melt adhesives which achieve a solid state and resultant strength by cooling from an elevated temperature. In other words, the application of heat melts the hot melt adhesive and after the heat source is removed, it solidifies simply by cooling. Hot melt adhesives are widely used in industrial applications because they can be used to form strong bonds very quickly. However, the difficulty associated with applying hot melt adhesives at elevated temperatures has greatly limited their usage in many applications.

Solution adhesives offer an advantage over hot melt adhesives in that heating is not required in their application to a substrate. Solution adhesives are widely utilized in general purpose and household applications because of their ease of application. Solution adhesives are also the adhesive of choice in a wide variety of industrial applications, such as those where the application of a hot melt adhesive would be difficult or impractical.

Copolyester resins are frequently utilized in solution adhesive compositions. Such solution adhesive compositions are simply prepared by dissolving the copolyester resin in a suitable organic solvent. It is highly desirable for the organic solvent to have a low boiling point. This results in faster rates of solvent evaporation and consequently reduces the time required for bonding. The copolyester resins utilized in solution adhesives commonly contain repeat units which are derived from terephthalic acid and isophthalic acid. Unfortunately, solutions of such copolyester resins form visible haze on standing. Haze formation is, of course, highly undesirable because it renders the solution adhesive composition unsuitable for use in many applications.

SUMMARY OF THE INVENTION

This invention overcomes the problem of haze formation in copolyester solution adhesive formulations. This invention is based upon the unexpected finding that solutions of copolyesters containing hydroxymethyl benzoic acid do not form haze upon standing. The present invention accordingly reveals a copolyester which is particularly useful as an adhesive which is comprised of repeat units which are derived from (a) a diacid component which is comprised of (1) from 0 to 60 mole percent terephthalic acid and (2) from 40 to 100 mole percent of at least one aliphatic dicarboxylic acid containing from 4 to 12 carbon atoms: (b) a diol component which is comprised of (1) from 0 to 75 mole percent neopentyl glycol and (2) from 25 to 100 mole percent ethylene glycol; and (c) hydroxymethyl benzoic acid.

The subject invention also discloses an adhesive composition which is comprised of (a) a copolyester which is particularly useful as an adhesive which is comprised of repeat units which are derived from (a) a diacid component which is comprised of (1) from 0 to 60 mole percent terephthalic acid and (2) from 40 to 100 mole percent of at least one aliphatic dicarboxylic acid containing from 4 to 12 carbon atoms: (b) a diol component which is comprised of (1) from 0 to 75 mole percent neopentyl glycol and (2) from 25 to 100 mole percent ethylene glycol: and (c) hydroxymethyl benzoic acid and (b) at least one organic solvent which is selected from the group consisting of carbon tetrachloride, chloroform, tetrachloroethane, methyl ethyl ketone, and tetrahydrofuran.

DETAILED DESCRIPTION OF THE INVENTION

The copolyesters of this invention are prepared by reacting a diacid component, a diol component, and hydroxymethyl benzoic acid. The diacid component utilized is a mixture of terephthalic acid and at least one aliphatic dicarboxylic acid containing from 4 to 12 carbon atoms. The diacid component can, of course, be a diester, such as dimethyl terephthalate or diethyl terephthalate. The term "diacid component" as used herein is therefore intended to include diesters of terephthalic acid and diesters of aliphatic dicarboxylic acids containing from 4 to 12 carbon atoms. Some representative examples of suitable aliphatic dicarboxylic acids containing from 4 to 12 carbon atoms include 1,4-butane dicarboxylic acid, 1,5-pentane dicarboxylic acid, 1,6-hexane dicarboxylic acid, 1,7-heptane dicarboxylic acid, 1,8-octane dicarboxylic acid, 1,9-nonane dicarboxylic acid, 1,10-decane dicarboxylic acid, 1,11-undecane dicarboxylic acid, and 1,12-dodecane dicarboxylic acid. The diacid component will normally contain from about 40 to about 60 mole percent terephthalic acid and from about 40 to about 60 mole percent aliphatic dicarboxylic acids. It is normally preferred for the acid component to be comprised of from about 45 mole percent to 55 mole percent terephthalic acid and from 45 mole percent to 55 mole percent aliphatic dicarboxylic acids.

The diol component utilized is a mixture of ethylene glycol and neopentyl glycol. The term "diol component" as used herein is also deemed to include glycol ethers (diethers). In other words, the diol component can include diethers of neopentyl glycol and diethers of ethylene glycol. The diol component is comprised of from about 0 to about 75 mole percent neopentyl glycol and from about 25 to about 100 mole percent ethylene glycol. In most cases, it will be preferred for the diol component to contain from about 0 to about 60 mole percent neopentyl glycol and from about 40 to about 100 mole percent ethylene glycol.

The hydroxymethyl benzoic acid utilized in the copolyesters of this invention will normally be p-hydroxymethyl benzoic acid. However, meta-hydroxymethyl benzoic acid can also be used in the preparation of such copolyesters. P-hydroxymethyl benzoic acid is believed to have been first synthesized in the 19th century by free-radical bromination of p-toluic acid to p-bromomethylbenzoic acid, hydrolysis with aqueous barium hydroxide and subsequent purification by recrystallization from water. Other methods for the preparation of p-hydroxymethyl benzoic acid and/or methyl p-hydroxymethylbenzoate have since been discovered, including: (a) hydrolysis of p-toluic acid derivatives functionalized at the benzylic position, such as p-halomethylbenzoic acid and esters; (b) hydrolysis of p-halomethylbenzonitriles, p-hydroxymethylbenzonitrile and p-chlorotoluyl chloride: (c) oxidation of p-xylene and substituted p-xylenes, such as p-hydroxymethyltoluene, p-acetoxymethyltoluene and p:xylenediol, and oxidation of p-toluic acid, p-tolualdehyde, and derivatives: (d) chloromethylation of benzoic acid and toluene derivatives: (e) carboxylation of p-halotoluene compounds via lithium salts: (f) disproportionation of terephthaldehyde (Cannizzaro reaction): (g) polargraphic reduction of dimethyl terephthalate: (h) electrochemical reduction of terephthalic acid in aqueous solution: (i) hydrolysis of the ester prepared by diborane reduction of monomethylterephthalate.

However, by whatever method prepared, p-hydroxymethyl benzoic acid must be substantially free from by-products such as 4-carboxylbenzaldehyde and p-toluic acid when it is to be used in polycondensation reactions, such as in the preparation of polyesters. A process for the purification of p-hydroxymethyl benzoic acid is disclosed in U.S. Pat. No. 4,447,645, which is incorporated herein by reference in its entirety.

The copolyesters of this invention can be synthesized utilizing conventional polymerization techniques which are well known in the art. Thus, conventional temperatures, catalysts, amounts of catalysts, stabilizers and the like, are used in manners well known in the literature and art. For instance, a two step process can be utilized in preparing the copolyesters of this invention. In the first step, the diacid component, the diol component and the hydroxymethyl benzoic acid can be heated to a temperature which is within the range of 150° C. to about 240° C. under an inert gas atmosphere, such as nitrogen or a Noble gas. For economic reasons, nitrogen will usually be utilized. This polymerization reaction can be carried out in the presence of appropriate catalysts, such as titanium alkoxides, tetraalkyl titanium compounds, or zinc acetates. In the second step, the polycondensation reaction can be carried out under a reduced pressure of less than about 0.5 mm of mercury (66.7 Pascals) at a temperature which is typically in the range of about 230° C. to about 300° C. The polymerization time required will vary with the amount and type of catalyst used as well as the polymerization temperature utilized. The extent of the polycondensation will also depend somewhat on the desired molecular weight of the copolyester being synthesized.

The copolyesters of this invention will have number average molecular weights which are within the range of about 4,000 to about 100,000. The copolyesters of this invention will more typically have molecular weights which are within the range of about 6,000 to about 75,000. In most cases, it will be preferred for the copolyesters of this invention to have number average molecular weights which are within the range of about 10,000 to about 40,000.

The molar ratio of repeat units derived from hydroxymethyl benzoic acid to repeat units which are derived from diacid components in the copolyesters of this invention will be within the range of about 1:7 to about 9:1. It is normally preferred for the molar ratio of repeat units derived from hydroxymethyl benzoic acid to repeat units which are derived from the diacid components to be within the range of 1:6 to 3:2.

Solution adhesives of the copolyesters of the present invention can be prepared by simply dissolving the copolyester in an appropriate organic solvent. Such solvents will have a relatively low boiling point and will be capable of dissolving a relatively large amount of hydroxymethyl benzoic acid per unit volume. It has been determined that carbon tetrachloride, chloroform, tetrachloroethane, methyl ethyl ketone and tetrahydrofuran have suitable properties for utilization as solvents in such adhesive compositions. Methyl ethyl ketone and tetrahydrofuran are particularly preferred for utilization as solvents in such solution adhesive compositions.

Such solution adhesives can contain up to about 45 weight percent copolyester resin, based upon the total weight of the solution. It is generally preferred for such solution adhesive compositions to contain from about 15 weight percent to about 25 weight percent copolyester resin, based upon the total weight of the solution adhesive composition.

Antidegradants, colorants, fillers or other desired agents can be added to the solution adhesives of this invention. The solution adhesive can then be utilized in a conventional manner such as by applying it to a substrate and transferring the substrate to a surface to which it is to be adhered. Upon evaporation of the solvent, bonding of the two surfaces results. Such solution adhesives are useful for adhering metal, plastics, natural and synthetic fabrics, paper, leather, cardboard and glass.

In order to more fully illustrate the nature of this invention and the manner of practicing the same, the following examples are presented. Unless specifically indicated otherwise, all parts and percentages are given by weight.

EXAMPLE 1

A polymerization reactor equipped with a stirrer and nitrogen inlet was charged with 21 g of p-hydroxymethyl benzoic acid, 21 g of azelaic acid (1,7-heptane dicarboxylic acid), and 20 g of ethylene glycol. The first stage reaction was carried out at 200° C. under a nitrogen atmosphere. After water was distilled out, 0.5 ml of a 1% tetrabutyl titanium in butane diol was added as a second stage catalyst. The final polycondensation reaction was carried out at 260° C. under a reduced pressure of less than 0.5 mm of mercury (66.7 Pascals). The copolyester produced had an intrinsic viscosity of 0.5 dl/g. It was transparent and soft at room temperature. The copolyester produced was readily soluble in methyl ethyl ketone and could be utilized in the preparation of a solution adhesive containing 40 weight percent solids. Such a 40 weight percent solution of the copolyester produced remained clear in methyl ethyl ketone for more than 4 months. Thus, haze did not form in the copolyester solution prepared. The solution adhesive composition prepared was determined to be useful as an adhesive or coating for a variety of substrates.

EXAMPLE 2

A polymerization reactor was charged with 22 g of dimethyl terephthalate, 44 g of ethylene glycol and a titanium catalyst. The first stage reaction was carried out at a temperature of 180° C. under a nitrogen atmosphere. After all the methanol was distilled off, 4 g of azelaic acid and 11 g of p-hydroxymethyl benzoic acid were added to the molten mixture. The reactor was heated to 230° C. under a nitrogen atmosphere for an additional 30 minutes. The temperature was then increased to 260° C. and the pressure was reduced to less than 66.7 Pascals with the polymerization being completed in about 2 hours. The final intrinsic viscosity of the polymer was determined to be 0.92 dl/g. The copolyester produced was determined to be very soluble in tetrahydrofuran. In fact, a 40 weight percent solution of the copolyester resin was prepared. The solution did not form haze upon standing and was determined to be useful as an adhesive or coating for many substrates.

EXAMPLE 3

The procedure specified in Example 2 was utilized in this experiment, except that 15 g of dimethyl terephthalate and 30 g of ethylene glycol were used in the first stage with 15 g of p-hydroxymethyl benzoic acid and 22 g of azelaic acid being charged into the second stage. Additionally, tin and antimony trioxide ($Sb_2O_3$) were utilized as the catalysts. The final intrinsic viscosity of the copolyester produced was determined to be 0.76 dl/g. The copolyester was soft and transparent. A solution of the copolyester synthesized in methyl ethyl ketone was prepared. It did not form haze upon standing and was determined to be an excellent solution adhesive for a wide variety of substrates.

While certain representative embodiments and details have been shown for the purpose of illustrating this invention, it will be apparent to those skilled in this art that various changes and modifications can be made therein without departing from the scope of the present invention.

What is claimed is:

1. A copolyester which is particularly useful as an adhesive which is comprised of repeat units which are derived from (a) a diacid component which is comprised of (1) from 0 to 60 mole percent terephthalic acid and (2) from 40 to 100 mole percent of at least one aliphatic dicarboxylic acid containing from 4 to 12 carbon atoms: (b) a diol component which is comprised of (1) from 0 to 75 mole percent neopentyl glycol and (2) from 25 to 100 mole percent ethylene glycol; and (c) hydroxymethyl benzoic acid.

2. An adhesive composition which is comprised of (a) the copolyester specified in claim 1 and (b) at least one organic solvent which is selected from the group consisting of carbon tetrachloride, chloroform, tetrachloroethane, methyl ethyl ketone, and tetrahydrofuran.

3. A copolyester as specified in claim 1 wherein the molar ratio of repeat units which are derived from hydroxymethyl benzoic acid to repeat units which are derived from diacid components is within the range of about 1:7 to about 9:1.

4. A copolyester as specified in claim 3 wherein the hydroxymethyl benzoic acid is p-hydroxymethyl benzoic acid.

5. A copolyester as specified in claim 4 wherein the aliphatic dicarboxylic acid containing from 4 to 12 carbon atoms is selected from the group consisting of 1,4-butane dicarboxylic acid, 1,5-pentane dicarboxylic acid, 1,6-hexane dicarboxylic acid, 1,7-heptane dicarboxylic acid, 1,8-octane dicarboxylic acid, 1,9-nonane dicarboxylic acid, 1,10-decane dicarboxylic acid, 1,11-undecane dicarboxylic acid, and 1,12-dodecane dicarboxylic acid.

6. A copolyester as specified in claim 5 wherein the diacid component is comprised of (1) from 40 to 60 mole percent terephthalic acid and (2) from 40 to 60 mole percent of at least one aliphatic dicarboxylic acid.

7. A copolyester as specified in claim 6 wherein the diol component is comprised of (1) from about 0 to about 60 mole percent neopentyl glycol and (2) from about 40 to about 100 mole percent ethylene glycol.

8. A copolyester as specified in claim 7 wherein the molar ratio of repeat units which are derived from p-hydroxymethyl benzoic acid to repeat units which are derived for diacid components is within the range of about 1:6 to about 3:2.

9. An adhesive composition as specified in claim 2 wherein the organic solvent is selected from the group consisting of methyl ethyl ketone and tetrahydrofuran.

10. An adhesive composition as specified in claim 2 wherein the molar ratio of repeat units which are derived from hydroxymethyl benzoic acid to repeat units which are derived from diacid components is within the range of 1:7 to 9:1.

11. An adhesive composition as specified in claim 10 wherein the hydroxymethyl benzoic acid is p-hydroxymethyl benzoic acid.

12. An adhesive composition as specified in claim 11 wherein the aliphatic dicarboxylic acid is selected from the group consisting of 1,4-butane dicarboxylic acid, 1,5-pentane dicarboxylic acid, 1,6-hexane dicarboxylic acid, 1,7-heptane dicarboxylic acid, 1,8-octane dicarboxylic acid, 1,9-nonane dicarboxylic acid, 1,10-decane dicarboxylic acid, 1,11-undecane dicarboxylic acid, and 1,12-dodecane dicarboxylic acid.

13. An adhesive composition as specified in claim 12 wherein the diacid component is comprised of from about 40 to about 60 mole percent terephthalic acid and from about 40 to about 60 mole percent aliphatic dicarboxylic acids.

14. An adhesive composition as specified in claim 13 wherein the diol component is comprised of (1) from about 0 to about 60 mole percent neopentyl glycol and (2) from about 40 to about 100 mole percent ethylene glycol.

15. An adhesive composition as specified in claim 14 wherein the aliphatic dicarboxylic acid is 1,7-heptane dicarboxylic acid.

16. An adhesive composition as specified in claim 15 wherein the adhesive composition contains from about 15 to about 25 weight percent copolyester resin, based upon the total weight of the adhesive composition.

17. An adhesive composition as specified in claim 16 wherein the mole ratio of repeat units derived from p-hydroxymethyl benzoic acid to repeat units which are derived from diacid components is within the range of about 1:6 to about 3:2.

18. An adhesive composition as specified in claim 11 wherein said adhesive composition contains up to about 45 weight percent copolyester based upon the total weight of the adhesive composition.

19. A copolyester as specified in claim 4 wherein the aliphatic dicarboxylic acid is 1,7-heptane dicarboxylic acid.

20. A copolyester as specified in claim 8 wherein the aliphatic dicarboxylic acid is 1,7-heptane dicarboxylic acid.

21. A copolyester as specified in claim 8 wherein the copolyester has a number average molecular weight which is within the range of about 6,000 to about 75,000.

22. A copolyester as specified in claim 9 wherein the diacid component is comprised of (1) from 45 to 55 mole percent terephthalic acid and (2) from 45 to 55 mole percent aliphatic dicarboxylic acids.

23. A copolyester as specified in claim 22 wherein the aliphatic dicarboxylic acid is 1,7-heptane dicarboxylic acid.

24. A copolyester as specified in claim 23 wherein the copolyester has a number average molecular weight which is within the range of about 10,000 to about 40,000.

25. A copolyester as specified in claim 4 wherein the copolyester has a number average molecular weight which is within the range of about 4,000 to about 100,000.

* * * * *